Sept. 16, 1969 F. C. BOLICK, JR 3,467,790

DICTATION-TRANSCRIPTION DEVICE

Filed Oct. 4, 1967 2 Sheets-Sheet 1

INVENTOR.
FRED C. BOLICK, JR.
BY Newton, Hopkins, Jones & Ormsby
ATTORNEYS

INVENTOR.
FRED C. BOLICK, JR.
BY Newton, Hopkins, Jones & Ormsby
ATTORNEYS

United States Patent Office 3,467,790
Patented Sept. 16, 1969

3,467,790

DICTATION-TRANSCRIPTION DEVICE

Fred C. Bolick, Jr., Atlanta, Ga., assignor to Lanier Electronics Laboratory, Inc., Atlanta, Ga., a corporation of Georgia Filed Oct. 4, 1967, Ser. No. 672,797
Int. Cl. G11b *5/78*
U.S. Cl. 179—100.1 13 Claims

ABSTRACT OF THE DISCLOSURE

What is disclosed herein is a dictation-transcription device using a tape for recording material during a plurality of successive dictation periods. The dictation-transcription device includes an adjusting means for making those changes in the position of the tape which are required for the tape to be in the proper position for initiation of a dictation period and an accumulating means for accumulating the time that the tape is in this position. The adjusting means includes a sensing means for sensing when the tape is not in the proper position for initiation of a dictation period, a tape advance means responsive to the sensing means for moving the tape into the proper position for the initiation of a dictation period, and a disabling means responsive to the sensing means for preventing the initiation of a dictation period when the tape is not in the proper position for the initiation of a dictation period. The proper position of the tape upon initiation of each dictation period that is provided by the adjusting means is that position at which the recording of material is on a portion of the tape not used in the immediately previous dictation period. The accumulating means includes the sensing means and a registering means responsive to the sensing means and provides a means for accumulating the time during a dictation period that recording of material is on a portion of the tape not used in the dictation period. The lapsed time accumulated by the accumulating means is an accurate indication of the length of the tape on which material is recorded.

BACKGROUND OF THE INVENTION

Field of the invention

The invention disclosed herein relates to a recording device for recording material on a tape and more particularly to a dictation-transcription device having an adjusting means for changing the position of a tape between dictation periods so as to insure that each dictation period is initiated with the tape properly positioned and having an accumulating means for accumulating the time of operation in an initial-recording mode.

Description of the prior art

Dictation-transcription devices with which material is recorded on a tape such as magnetizable tape for subsequent transcription are well known in the prior art. These dictation-transcription devices generally provide for at least four modes of operation during a dictation period. One of these modes is the initial-recording mode by which the tape is progressively moved in a first direction relative to a recording means for material to be initially recorded on the tape. A second of these modes is the recording-reverse mode by which the tape is moved in a second direction opposite to the first direction for subsequent correction of recorded material by recording or for subsequent review of recorded material by listening.

The third of these modes is subsequent to operation in the recording-reverse mode and is the recording-correction mode by which the tape is moved in the first direction and material previously recorded on the tape is changed or corrected by recording. The fourth of these modes is also subsequent to operation in the recording-reverse mode and is the recording-review mode by which the tape is moved in the first direction and material previously recorded on the tape is reviewed by listening.

With a dictation-transcription device having these four and other modes of operation, a dictation period is frequently terminated after operation in the recording-reverse mode but before operation in the recording-correction mode or in the recording-review mode has moved the entire length of the tape which moved in the second direction during operation in the recording-reverse mode in the first direction relative to the recording means. This may be caused by the person using the dictation-transcription device being satisfied with the recorded material after reviewing only a portion of it during the recording-review mode of operation or this may be caused by the accidental or improper operation of the dictation-transcription device.

Whatever the cause, the result is the termination of a dictation period with the tape not properly positioned for initiating a subsequent dictation period. This is because there is tape in position for the recording of material on it during the subsequent dictation period which has material from the previous dictation period recorded on it.

In prior art dictation-transcription devices, this improper position of the tape causes material recorded during a previous dictation period to be lost by recording of new material over it. Moreover, in a dictation-transcription device arranged in a system for use by a plurality of persons at various recording stations, this improper position frequently causes material recorded by one person during a dictation period to be heard by other persons when the dictation-transcription device is initially operated in the recording-review mode rather than in the initial recording mode.

These difficulties are not avoided in a dictation-transcription device having means for preventing motion of the tape in its second direction during a dictation period beyond the position of the tape when the dictation period was initiated since they are caused by this position being improper and not by the motion of the tape. Moreover, in addition to these difficulties, the many modes of operation of a prior art dictation-transcription device have made it difficult to provide an accurate indication of the total length of a tape on which material is recorded.

Summary of the invention

The invention disclosed herein avoids these and other difficulties encountered with prior art dictation-transcription devices in that it provides a dictation-transcription device having an adjusting means for making required changes in the position of the tape between dictation periods so that each dictation period is initiated with the tape in that position which prevents loss of or listening to material recorded on the tape during a previous dictation period and having an accumulating means for accumulating time of operation in the initial-recording mode. Thus, whether the dictation-transcription device is arranged in a system for use from only one recording station or for use from a plurality of recording stations, the inadvertent recording over material recorded on the tape during a previous dictation period and the listening to material recorded on the tape during a previous dictation period are both avoided and an accurate indication of the length of the tape on which material is recorded by the initial-recording mode is provided.

The adjusting means by which some of these improvements in a dictation-transcription device are provided includes a sensing means for sensing the position of the tape relative to a recording means for recording on the tape, a tape advance means responsive to the sensing means for moving any segment of the tape used during the immediately previous dictation period into a position in which recording on the segment by the recording means cannot occur, and a disabling means responsive to the sensing means for preventing the initiation of a dictation period when any segment of the tape used during the immediately previous dictation period is in a position in which recording on the segment by the recording means can occur. The accumulating means by which others of these improvements in a dictation-transcription device are provided includes the sensing means and a registering means responsive to the sensing means and serves to accumulate the total time that the dictation-transcription device is operated in the initial-recording mode. The accumulating means provides a convenient indication of the length of the tape on which material is recorded since the length of the tape on which material is recorded is directly proportional to the time during which the dictation-transcription device is operated in the initial-recording mode.

In that embodiment of the invention disclosed herein, the sensing means used in the adjusting means and in the accumulating means includes a switch member having a first condition in response to the position of the tape during operation of the dictation-transcription device in the initial-recording mode and a second condition in response to the positions of the tape during operation of the dictation-transcription device in the recording-reverse mode, the recording-correction mode, or the recording-review mode. During a particular dictation period, the switch member may be either in its first condition or in its second condition without changing or interfering with the operation of the dictation-transcription device in any mode of operation. However, the registering means is responsive to the first condition of the switch member throughout each dictation period so as to accumulate and register operating time in the initial-recording mode as an indication of the length of tape on which material is recorded.

The disabling means and the tape advance means both include the switch member and both are responsive to the second condition of the switch member when a dictation period is terminated with the switch member in its second condition. The disabling means in response to termination of a dictation period with the switch member in its second condition prevents the initiation of a subsequent dictation period while the switch member is in its second condition.

The tape advance means in response to termination of a dictation period with the switch member in its second condition causes the dictation-transcription device to operate in a simulated recording-review mode and move the tape until all tape used for recording during the previous dictation period is in a position in which recording upon it cannot occur. When all tape used in the previous dictation period is in a position in which recording upon it cannot occur, the position of the tape is the same as during operation of the dictation-transcription device in the initial-recording mode and this places the switch member in its first condition so as to make both the disabling means and tape advance means inoperative.

Brief description of the drawing

These and other features and advantages of the invention will be more clearly understood from the following detailed description and the accompanying drawing in which like characters of reference designate corresponding parts throughout and in which.

Description of an embodiment

Figure 1:
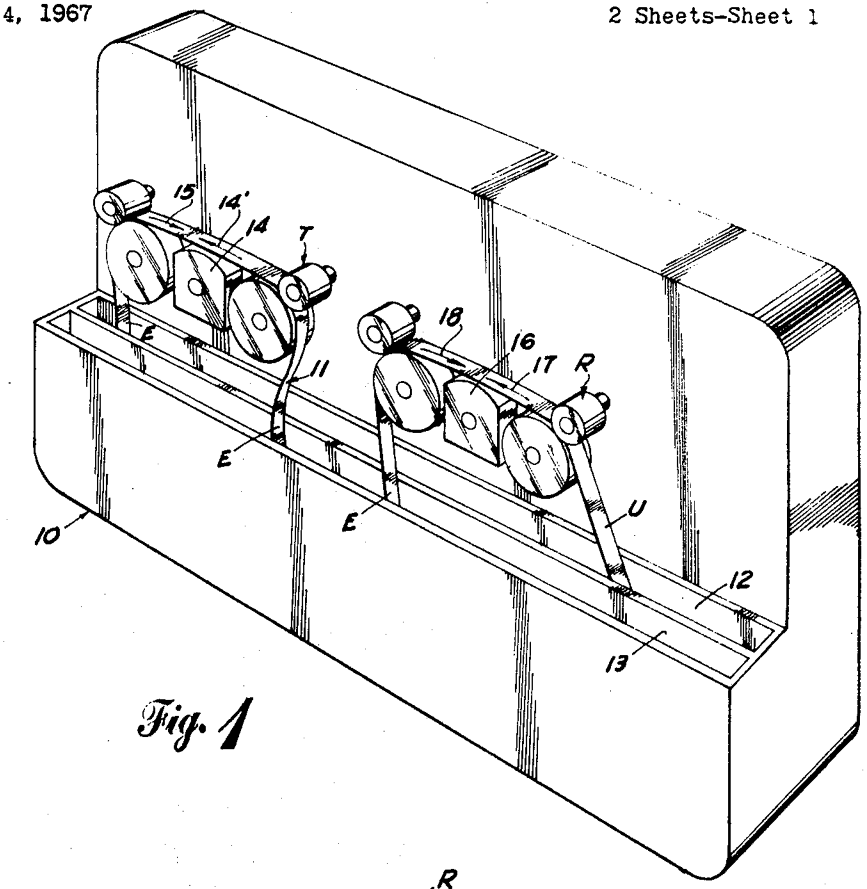
FIG. 1 is a perspective view of a dictation-transcription device having a plurality of tape magazines and of a type in which the invention disclosed herein may be conveniently embodied.

The following detailed description discloses a specific embodiment of the invention. However, it will be understood that the invention may be embodied in other equivalent forms without departing from the inventive concept.

The invention disclosed herein is best understood as a recording device such as a dictation-transcription device 10 having an accumulating means for accumulating time proportional to the length of a tape 11 on which material is recorded and having an adjusting means for making required changes in the position of the tape 11 between dictation periods so as to insure that the tape 11 is always properly positioned at the initiation of each dictation period. The tape 11 will be understood to be an endless magnetizable tape or other tape used for recording material along its length in a track parallel to its edge; and the adjusting means is best understood as including a sensing means for sensing the position of the tape 11, a tape advance means for moving the tape 11 between dictation periods until the tape 11 is properly positioned for the initiation of a dictation period, and a disabling means for preventing the initiation of a dictation period when the tape 11 is not properly positioned for the initiation of a dictation period. The accumulating means is best understood as including the sensing means and a registering means 41.

The invention is most easily understood in terms of a dictation-transcription device 10 which is generally conventional except for the adjusting means and the accumulating means. This dictation-transcription device 10 is shown in FIG. 1 and from FIG. 1 it will be seen that the dictation-transcription device 10 includes a transcribed tape bin 12 and a recorded tape bin 13 between which the tape 11 is moved by a transcribing mechanism T and a recording mechanism R which together provide the various modes of operation of the dictation-transcription device 10.

In the dictation-transcription device 10 shown in FIG. 1, the transcribing mechanism T provides an initial-transcribing mode of operation by moving the tape 11 adjacent a transcribing head 14 from the recorded tape bin 13 to the transcribed tape bin 12 in a transcribing direction 14' and in a path which is parallel to an edge of the tape 11. The transcribing mechanism T provides a transcribing-reverse mode of operation by moving the tape 11 from the transcribed tape bin 12 to the recorded tape bin 13 in a transcribing-review direction 15 and provides a transcribing-review mode of operation by subsequently moving the tape 11 in the transcribing direction 14'.

Similarly, the recording mechanism R provides an initial-recording mode of operation by moving the tape 11 adjacent a recording-listening head 16 from the transcribed tape bin 12 to the recorded tape bin 13 in a recording direction 17 and in a path which is parallel to an edge of the tape. The recording mechanism R provides a recording-reverse mode of operation by moving the tape 11 from the recorded tape bin 13 to the transcribed tape bin 12 in a recording-review direction 18 and provides either a recording-correction or a recording-review mode of operation by subsequently moving the tape in the recording direction 17 while the recording-listening head 16 is operated to record material on the tape 11 or to respond to material recorded on the tape 11.

The transribing mechanism T and the recording mechanism R are not fully described and other details of the transcription-recording device 10 for providing the various modes of operation described above are not shown or described because they will be understood by those skilled in the art from the foregoing general description. It will also be understood by those skilled in the art that in a recording device such as the dictation-transcription device 10 shown in FIG. 1, the recording medium such as the tape 11 may be classified into two continuously changing portions related to the recording of material on the tape 11.

One of these portions of the tape 11 is the recorded portion E and is that length of the tape 11 upon which material has been recorded by the recording-listening head 16 and which is in the recorded tape bin 13 or extending between the recorded tape bin 13 and the transcribing mechanism T or the recording mechanism R. The second portion of the tape 11 is the unrecorded portion U and is that length of the tape 11 from which material has been transcribed and erased so that it is available for recording and which is in the transcribed tape bin 12 or extending between the transcribed tape bin 12 and the recording mechanism R. The erasing of material which has been transcribed from the tape 11 occurs in conventional manner as the tape 11 passes an erasing head 23 positioned in the transcribed tape bin 12.

Considering the portions E and U of the tape 11, the proper position of the tape 11 upon initiation of a recording or dictation period is with recorded portion E and the unrecorded portion U of the tape 11 entirely on opposite sides of a recording means such as the recording-listening head 16. In the dictation-transcription device 10 shown in FIG. 1, this proper position is with that entire length of the recorded portion E of the tape 11 to the left of the recording-listening head 16 as shown in FIG. 1. This is the proper position of the tape 11 upon initiation of a dictation period because the improper positioning of the tape 11 so that a segment of the recorded portion E is to the right of the recording-listening head 16 would result in material on this segment being destroyed if the initial operation of the dictation-transcription device 10 is in the initial-recording mode or the recording-correction mode or being heard if the initial operation of the dictation-transcription device 10 is in the recording-review mode.

This result would occur even though the dictation-transcription device 10 is arranged in conventional manner to prevent motion of the tape 11 during a dictation period in the recording-review direction 18 beyond its initial position during the dictation period. This is because it is caused by the initial position of the tape 11 and by the operation of the dictation-transcription 10 in one of the plurality of modes which are generally not restricted in use. It is to preventing this result that the adjusting means in a dictation-transcription device 10 embodying the invention disclosed herein is directed.

Figure 2:
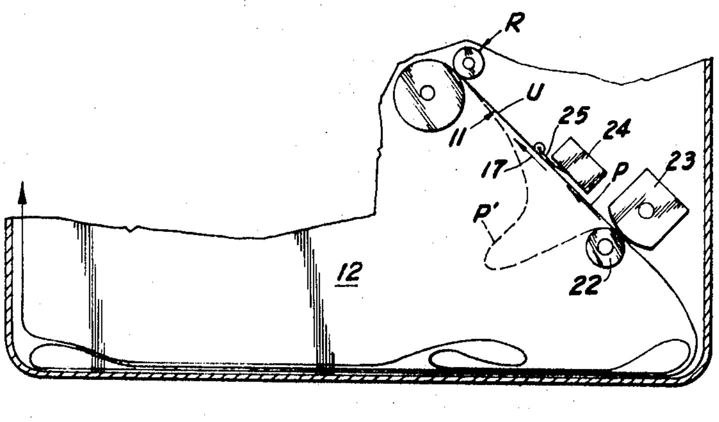
FIG. 2 is a partial cross-sectional view of the dictation-transcription device shown in FIG. 1 showing the sensing means of an embodiment of the invention positioned in a tape magazine.
Figure 3:
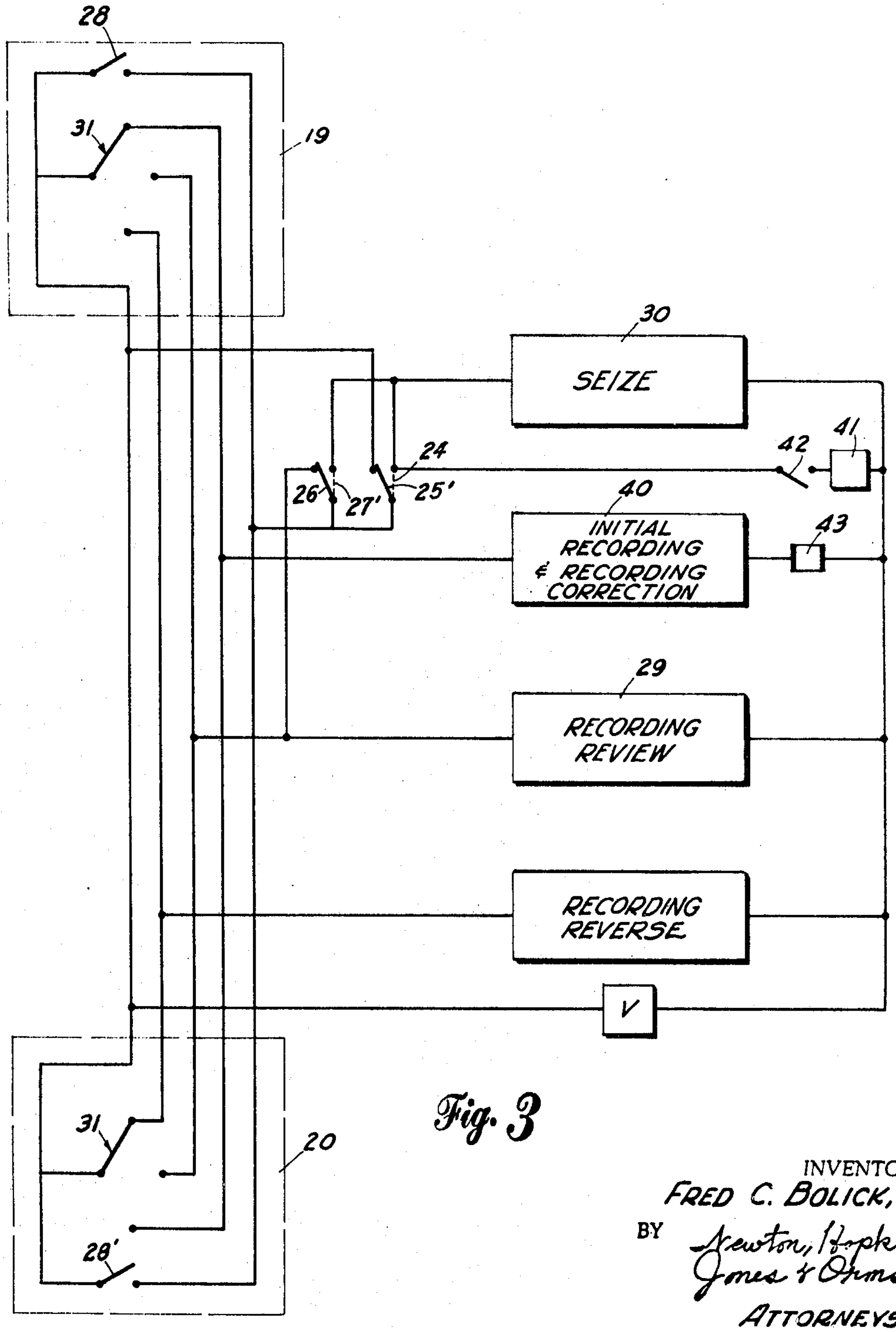
FIG. 3 is a schematic circuit diagram of a dictation-transcription device such as that shown in FIG. 1 embodying the invention.

The adjusting means and the accumulating means are both best shown in FIG. 2 and FIG. 3 and in regard to FIG. 3, it should be first noted that FIG. 3 shows a dictation-transcription device 10 as a schematic circuit diagram limited to the modes of operation related to recording material on a tape 11. The components of the dictation-transcription device required for each of these modes are represented by an appropriately labeled block since they are conventional and will be understood by those skilled in the art. However, in addition to blocks for these modes of operation, FIG. 3 shows as a block the conventional seize components 30 of a dictation-transcription device 10 which are required to seize the recording-transcription device 10 so that it is operative and can be controlled from one of a plurality of recording stations 19 and 20. Those skilled in the art will understand that whenever a dictation-transcription device 10 is operative from one of a plurality of recording stations 19 and 20, the seize components 30 represented by the seize block in FIG. 3 not only provide an operating or control means for making the dictation-transcription device 10 operative by a recording station 19 or 20 but also serve to prevent the dictation-transcription device 10 from being made operative by a recording station 19 or 20 when it is already operative.

FIG. 3 shows a plurality of recording stations 19 and 20 arranged for use in a system with the dictation-transcription device 10 because the proper position of the tape 11 upon the initiation of a dictation period is of critical importance in such a system to prevent conflicts between recording stations 19 and 20. However, it will be understood from what is said below that the adjusting means as well as the accumulating means may be embodied in a dictation-transcription device 10 which is used in a system with only one recording station 19 or 20 and in which the seize components 30 simply serve as a control means for making the dictation-transcription device 10 operative.

Moreover, regardless of the number of recording stations 19 and 20 used with a dictation-transcription device 10 in a system, the adjusting means and the accumulating means both include the sensing means responsive to the position of the tape 11. The sensing means is best shown in FIG. 2 from which it will be seen that in that embodiment of the invention disclosed herein, the sensing means includes an idler roller 22 rotatably positioned in the transcribed tape bin 12 so that the unrecorded portion U of the tape 11 passes between it and the erasing head 23 and along a path P as the unrecorded portion U is pulled from the transcribed tape bin 12 by the recording mechanism R. In addition, the sensing means includes the switch member 24 having an actuator arm 25 which is engaged and held by the tape 11 in the path P in a position that places the switch member 24 in a first condition and which is urged against the tape 11 in conventional manner toward a second position that places the switch member 24 in a second condition.

It will now be seen that when the tape 11 is pulled from the transcribed tape bin 12 by operation of the dictation-transcription device 10 in the initial-recording mode upon initiation of a dictation period or during a dictation period, the tape 11 must be in the path P since it is being pulled in the recording direction 17 from between the idler roller 22 and the erasing head 23. Thus, the idler roller 22, the erasing head 23, and the recording mechanism R serve as a positioning means for positioning the tape 11 in the path P when the dictation-transcription device 10 is operating in the initial-recording mode. However, when the tape 11 is moved in the recording-review direction 18 by operation of the dictation-transcription device 10 in the recording-reverse mode, the idler roller 22 and the erasing head 23 serve as a tape restraining means for preventing movement of the tape 11 downwardly into the transcribed tape bin 12 from between the idler roller 22 and the erasing head 23. Thus, any length of the tape 11 which is moved in the recording-review direction 18 causes the tape 11 to assume a path P′ between the idler roller 22 and the recording mechanism R.

This path P′ is shown in dashed line in FIG. 2 and may be as shown in FIG. 2 or serpentine if the length of the tape 11 moved in the recording-review direction 18 is sufficiently great. However, regardless of the length of the path P′, when the tape 11 is in the path P′, the actuator arm 25 of the switch member 24 is no longer held in its first position by the tape 11 and is in its second position so as to place the switch member 24 in its second condition. Moreover, even when the tape 11 is subsequently moved in the recording direction 17 by operation of the dictation-transcription device 10 in the recording-correction mode or the recording-review mode, the switch member 24 remains in its second condition until the entire length of the tape 11 which previously moved in the recording-review direction 18 has again passed the recording-listening head 16 and operation of the dictation-transcription device 10 is again in the initial-recording mode.

From the foregoing, it will now be understood that the switch member 24 is in its first condition only when the tape 11 is positioned with the recorded portion E of the tape 11 separated from the unrecorded portion U of the tape 11 by the recording-listening head 16 so that the dictation-transcription device 10 is operating or ready to operate in the initial-recording mode for recording material on the unrecorded portion U of the tape 11. Similarly, it will now be understood that the switch member 24 is in its second condition whenever the tape 11 is positioned with the recorded portion E of the tape 11 not separated from the unrecorded portion U of the tape 11 by the recording-listening head 16 so that the dictation-transcription device 10 is operating or ready to operate in the recording-reverse mode, the recording-correction mode, or the recording-review mode. It will also now be understood that the switch member 24 is in its second condition when a dictation period is terminated with the dictation-transcription device 10 operating in the recording-reverse mode, the recording-correction mode, or the recording-review mode.

It is because of these two conditions of the switch member 24 that the sensing means serves in the adjusting means as a means for sensing the position of the tape 11 in terms of whether the tape 11 is properly positioned for the initiation of a dictation period or is improperly positioned so that the initiation of a dictation period would result in recording over previously recorded material or in hearing previously recorded material. Moreover, the two conditions of the switch member 24 can be used in a variety of circuit arrangements with the registering means 41 to provide an accumulating means and in a tape advance means and a disabling means to provide an adjusting means for correcting the position of the tape 11 to insure that the tape 11 is always properly positioned upon the initiation of a dictation period.

In that embodiment of the invention disclosed herein, the switch member 24 in its first condition as indicated by dashed line 25′ in FIG. 3 is in parallel with a switch member 26 in its first condition as indicated by dashed line 27 between the seize components 30 of the dictation-transcription device 10 and the seize switches 28 and 28′ in the recording stations 19 and 20. The seize switches 28 and 28′ are operative to seize and make operative the dictation-transcription device 10. The switch member 26 is biased into its second condition as shown by solid line in FIG. 3 in conventional manner and is moved to and held in its first condition in conventional manner only when and as long as the seize components 30 of the dictation-transcription device 10 are energized.

In its second condition, the switch member 26 is in series with the switch member 24 in its second condition as shown by solid line in FIG. 3 and with the recording-review components 29 of the dictation-transcription device 10. Thus, it will be understood that the switch member 24 in its second condition, the switch member 26 in its second condition, and the recording-review components 29 together serve to provide a tape advance means for operating the dictation-transcription device 10 in a simulated recording-review mode so as to move the tape 11 in the recording direction 17 as long as the switch members 24 and 26 are both in their respective second conditions.

Similarly, it will be understood from FIG. 3 that the switch member 24 in its second condition and the switch member 26 in its second condition together serve to provide a disabling means which prevents the energizing of the seize components 30 of the dictation-transcription device 10 by the operation of a seize switch 28 or 28′ at any of the recording stations 19 and 20. In addition, it will be understood that an accumulating means is provided by the switch member 24 in its first condition and the registering means 41 both in series with the contacts 42 of a relay having its coil 43 for closing the contacts 42 in series with the initial-recording components 40 of the dictation-transcription device 10. This is because the operation of the registering means 41 only when the tape 11 is moving in the recording direction 17 and the switch member 24 is in its first condition provides a duration of operation of the registering means 41 which is directly proportional to motion of the tape 11 during the initial-recording mode even though the initial-recording components 40 may be the same components as those used for the recording-correction mode as indicated in FIG. 3.

Operation

The tape advance means, the disabling means and the accumulating means and their relationship to the sensing means will be further understood from the following description of the operation of a dictation-transcription device 10 having an adjusting means and an accumulating means. The operation of a dictation-transcription device 10 having an adjusting means and an accumulating means is best understood by considering the dictation-transcription device 10 upon the initiation of a dictation period with the tape 11 properly positioned, during recording, upon termination of a dictation period with the tape 11 properly positioned for the initiation of a subsequent dictation period, and upon termination of a dictation period with the tape 11 improperly positioned for the initiation of a subsequent dictation period. Upon initiation of a dictation period with the tape 11 properly positioned, the switch member 24 is in its first condition because the tape 11 is in the path P and the switch member 26 is in its second condition because the seize components 30 of the dictation-transcription device 10 are not energized.

With the switch members 24 and 26 in their first and second conditions respectively, the closing of a seize switch 28 or 28′ at either the recording station 19 or 20 causes the energizing of the size components 30 of the dictation-transcription device 10 through the switch member 24. This places the dictation-transcription device 10 under the control of a recording station 19 or 20 in conventional manner so that operation of a mode selecting means such as a selecting switch 31 at a recording station 19 or 20 provides the various modes of operation required for recording material on the tape 11.

Immediately following initiation of a dictation period with the tape 11 properly positioned and during the dictation period, the switch member 26 is in its first condition because the seize components 30 of the dictation-transcription device 10 are energized. As a result, the moving of the switch member 24 from its first condition to its second condition during the dictation period because the dictation-transcription device 10 is operated in the recording-reverse mode to position the tape 11 in the path P′ will not cause the de-energizing of the seize components 30 of the dictation-transcription device 10 or otherwise interfere with the operation of the dictation-transcription device 10.

Rather, because the switch member 26 in its first condition provides a holding circuit for the seize components 30, once a dictation period has been initiated by closing a seize switch 28 or 28′ at a recording station 19 or 20 while the switch member 24 is in its first condition, the operation of the dictation-transcription device 10 is conventional even though the switch member 24 moves between its first condition and its second condition a plurality of times during the dictation period. However, during a dictation period, the registering means 41 operates only when the switch member 24 is in its first condition. Thus, when the registering means 41 is a lapsed-time clock or other conventional device for accumulating increments of time, the time accumulated and registered by the registering means 41 is the time that the dictation-transcription device has operated in its initial recording mode and which is directly proportional to the length of the tape 10 on which material is recorded.

Upon the termination of a period of dictation, the holding circuit through the switch member 26 is opened by a seize switch 28 or 28', the seize components 30 of the dictation-transcription device 10 are de-energized, and the switch member 26 changes from its first condition to its second condition. This occurs regardless of the position of the tape 11 and the resulting condition of the switch member 24. However, if the dictation period is terminated with the tape 11 properly positioned for the initiation of a subsequent dictation period, the switch member 24 is in its first condition and a subsequent period of dictation can be initiated by simply closing a seize switch 28 or 28' at a recording station 19 or 20 even though the switch member 26 is in its second condition.

If the dictation period is terminated with the tape 11 improperly positioned for the initiation of a subsequent dictation period because a segment of the recorded portion E of the tape 11 is to the right of the recording-listening head 16 as seen in FIG. 1, the switch member 24 is in its second condition and the moving of the switch member 26 to its second condition because the seize components 30 are de-energized prevents the subsequent operation of a seize switch 28 or 28' from energizing the seize components 30. Thus, the switch member 24 in its second condition and the switch member 26 in its second condition serve as a disabling means for preventing the initiation of a dictation period with a control means such as the seize components 30.

Moreover, the switch member 24 in its second condition and the switch member 26 in its second condition also serve with the recording-review components 29 of the dictation-transcription device 10 to provide a tape advance means. This is because the switch member 24 in its second condition and the switch member 26 in its second condition provide a circuit through the recording-review components 29 which causes operation of the dictation-transcription device 10 in a simulated recording-review mode and motion of the tape 11 in the recording direction 17. The motion of the tape 11 in the recording direction 17 continues until the tape 11 is in the path P and properly positioned for the initiation of a subsequent dictation period.

When the tape 11 returns to the path P, the switch member 24 is changed from its second condition to its first condition in series with the seize components 30 of the dictation-transcription device 10. This change in condition of the switch member 24 stops operation of the dictation-transcription device 10 in the simulated recording-review mode and places the dictation-transcription device 10 in condition to be seized and operated by a recording station 19 or 20.

It will now be apparent that the adjusting means provided by a sensing means, a tape advance means, and a disabling means in a dictation-transcription device 10 embodying the invention disclosed herein serves to insure that the tape 11 is properly positioned for the initiation of a dictation period by sensing an improper position of the tape 11, by moving the tape 11 from its improper position to its proper position, and by preventing the initiation of a dictation period until the tape 11 is in its proper position. It will also be apparent that the accumulating means provided by a sensing means and a registering means 41 in a dictation-transcription device 10 embodying the invention disclosed herein serves to provide for accumulating increments of time which are proportional to the length of the tape 11 on which material is recorded.

I claim:

1. In a recording device, recording means for recording on a recording medium, control means for moving said recording medium in a first direction relative to said recording means so that said recording means records on said recording medium in a track parallel to an edge of said recording medium and for moving said recording medium in a second direction relative to said recording means, adjusting means selectively responsive to said recording medium being moved in said second direction for returning a length of said recording medium to the position occupied prior to being moved in said second direction, and disabling means for rendering said control means inoperative when said adjusting means is operative.

2. The recording device of claim 1 including registering means selectively operative in response to said control means being operative to move said recording medium in said first direction relative to said recording means for accumulating a quantity proportional to the time that said registering means is operative.

3. The recording device of claim 1 in which said adjusting means includes a sensing means for sensing when said recording medium is moved in said second direction and advance means responsive to said sensing means for moving said recording medium in said first direction.

4. The recording device of claim 3 in which said sensing means has a first condition to which said advance means is responsive and a second condition to which said advance means is not responsive and including a registering means responsive to said second condition for registering a quantity proportional to the duration of the simultaneous occurrence of said second condition and motion of said recording medium relative to said recording means in said first direction.

5. The recording device of claim 3 including disabling means responsive to said sensing means simultaneously with said advance means for rendering said control means inoperative.

6. The recording device of claim 1 including selecting means operatively responsive to said control means for providing each of a plurality of modes of operation of the recording device and in which said adjusting means is responsive to said recording medium being moved in said second direction during one of said modes of operation.

7. The recording device of claim 6 including an accumulating means responsive to another of said modes of operation for accumulating a quantity related to the duration of said another of said modes of operation.

8. The recording device of claim 1 in which said control means is operative during a recording period and in which said adjusting means is inoperative during said recording period.

9. In a recording device, control means for moving a tape and a recording means in a first direction and in a second direction relative to each other in a path which is parallel to an edge of said tape, switch means responsive to motion of said tape as said tape is being moved in said second direction for providing a switch condition, and adjusting means responsive to said switch condition when said control means is inoperative for providing motion of said tape in said first direction.

10. The recording device of claim 9 including disabling means responsive to said switch condition for preventing operation of said control means.

11. The recording device of claim 9 in which said switch condition is a first switch condition which is an alternative to a second switch condition and including accumulating means operating in response to said second condition and to said tape and said recording means moving in said first direction relative to each other for accumulating a quantity proportional to the time that said accumulating means is operative.

12. The recording device of claim 9 in which said switch means is positioned within a bin from which said tape is removed and in which said switch condition is in response to the absence of said tape from a path within said bin.

13. The recording device of claim 12 in which said switch means has a second switch condition in response to said tape in said path and including accumulating means for accumulating increments of a quantity proportional to the time that said tape and said recording means are moved relative to each other in said first direction while said switch means is in said second condition.

References Cited

UNITED STATES PATENTS

| | | | |
|---|---|---|---|
| 2,606,253 | 8/1952 | Somers | 179—100.1 |
| 2,988,604 | 6/1961 | Nye | 179—199.2 |
| 3,024,320 | 3/1962 | Nye | 179—100.2 |
| 3,197,562 | 7/1965 | Happold et al. | 179—6 |
| 2,297,242 | 9/1942 | Pohlmann. | |
| 3,031,534 | 4/1962 | Trumble. | |
| 3,086,086 | 4/1963 | Ernst et al. | |
| 3,091,668 | 5/1963 | Trost. | |
| 3,257,515 | 6/1966 | Nakamatsu. | |
| 3,341,668 | 9/1967 | Walker. | |

BERNARD KONICK, Primary Examiner

J. RUSSELL GOUDEAU, Assistant Examiner

U.S. Cl. X.R.

179—6, 100.2